(12) United States Patent
Zhou et al.

(10) Patent No.: US 12,416,975 B2
(45) Date of Patent: Sep. 16, 2025

(54) SMART GESTURE INTERACTIVE DISPLAY APPARATUS WITH HOLOGRAPHIC EFFECT

(71) Applicant: SHENZHEN SHENKUN TECHNOLOGY CO., LTD, Shenzhen (CN)

(72) Inventors: Guanglei Zhou, Shenzhen (CN); Wenli Yang, Shenzhen (CN)

(73) Assignee: SHENZHEN SHENKUN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/594,788

(22) Filed: Mar. 4, 2024

(65) Prior Publication Data

US 2024/0211052 A1    Jun. 27, 2024

Related U.S. Application Data

(63) Continuation of application No. PCT/CN2022/095398, filed on May 27, 2022.

(30) Foreign Application Priority Data

Sep. 17, 2021  (CN) .......................... 202111091513.4

(51) Int. Cl.
*G06F 3/01*         (2006.01)
*G02B 30/40*     (2020.01)
(Continued)

(52) U.S. Cl.
CPC ............. *G06F 3/017* (2013.01); *G02B 30/40* (2020.01); *G06F 3/0421* (2013.01); *G06V 10/74* (2022.01); *G06V 10/803* (2022.01); *G06V 40/20* (2022.01)

(58) Field of Classification Search
CPC .......... G06F 3/017; G06F 3/0421; G06F 3/01; G06F 3/0304; G06F 3/011; G06F 3/0425;
(Continued)

(56) References Cited

U.S. PATENT DOCUMENTS 9,224,366 B1 * 12/2015 Park ..................... H04N 13/398
9,377,874 B2 *  6/2016 Aull ....................... G06F 3/0425
(Continued)

FOREIGN PATENT DOCUMENTS

CN        104238923 B  *  3/2019 ............ G09F 9/301
CN        113672096 A      11/2021
(Continued)

*Primary Examiner* — Grant Sitta (57) ABSTRACT

The present invention provides a smart gesture interactive display apparatus with a holographic effect, including: an interactive projection box, a flexible projection display screen adjustment apparatus, and a flexible projection screen. Accommodating cavities are provided in the flexible projection display apparatus, and a screw sliding table, fastening supports, a flexible projection display screen, and multiple high-definition cameras are installed. A laser ranging module is disposed in the accommodating cavity. A main control module is disposed in the interactive projection box, to be connected to a motor, the high-definition cameras, and the laser ranging module, so that a bending angle of the flexible projection screen is adjusted by using a gesture.

8 Claims, 4 Drawing Sheets

(51) Int. Cl.
  *G06F 3/042*   (2006.01)
  *G06V 10/74*   (2022.01)
  *G06V 10/80*   (2022.01)
  *G06V 40/20*   (2022.01)
(58) Field of Classification Search
  CPC ...... G02B 30/40; G06V 10/74; G06V 10/803;
                    G06V 40/20; G03B 21/56
  See application file for complete search history.

(56) References Cited

U.S. PATENT DOCUMENTS

| | | | | |
|---|---|---|---|---|
| 9,522,326 | B2* | 12/2016 | Lin | A63F 13/25 |
| 9,733,728 | B2* | 8/2017 | Ano | G06F 3/0418 |
| 10,268,277 | B2* | 4/2019 | Kang | G06F 3/005 |
| 10,990,062 | B2* | 4/2021 | Wang | G03H 1/0005 |
| 2008/0150913 | A1* | 6/2008 | Bell | G06F 3/011 |
| | | | | 345/175 |
| 2009/0103780 | A1* | 4/2009 | Nishihara | G06F 3/0425 |
| | | | | 382/103 |
| 2009/0316952 | A1* | 12/2009 | Ferren | G06F 3/017 |
| | | | | 382/103 |
| 2015/0317979 | A1* | 11/2015 | Yang | G10L 17/22 |
| | | | | 704/235 |
| 2016/0050394 | A1* | 2/2016 | Segal | H04N 7/15 |
| | | | | 348/14.08 |
| 2020/0142495 | A1* | 5/2020 | Steinberg | G06V 40/18 |
| 2022/0197371 | A1* | 6/2022 | Press | G06F 3/017 |

FOREIGN PATENT DOCUMENTS

| | | | |
|---|---|---|---|
| CN | 113744647 | A | 12/2021 |
| CN | 216596177 | U | 5/2022 |

\* cited by examiner

SMART GESTURE INTERACTIVE DISPLAY APPARATUS WITH HOLOGRAPHIC EFFECT

CROSS-REFERENCE TO RELATED APPLICATIONS

The application claims priority to Chinese patent application No. 202111091513.4, filed on Sep. 17, 2021, the entire contents of which are incorporated herein by reference.

TECHNICAL FIELD

The present invention relates to the technical field of interactive display apparatuses, and in particular, to a smart gesture interactive display apparatus with a holographic effect.

BACKGROUND

At present, in existing technologies, a device that uses a projection apparatus to project an image onto a transparent projection plate pasted with a holographic film in a manner of rear projection, to present a holographic effect. However, because all projected images are displayed on a same plane, the holographic effect displayed in this way is not very ideal from a sensory perspective, to improve the holographic effect of the projected images, a flexible projection display screen is used and bent to a specific angle, to improve the holographic effect through projection. When the flexible projection display screen is bent, it is not easy to adjust bending and deformation of the flexible projection display screen by touching the flexible projection display screen, and a gesture is used to adjust the bending and deformation of the flexible projection display screen. Therefore, how to adjust a bending angle of the flexible projection display screen by using a gesture is a technical problem that needs to be solved.

SUMMARY

The present invention is intended to resolve at least one of technical problems existing in existing technologies or related technologies, and discloses a smart gesture interactive display apparatus with a holographic effect, so that a bending angle of a flexible projection display screen can be adjusted by using a gesture.

The present invention is implemented in the following solutions: a smart gesture interactive display apparatus with a holographic effect, including: an interactive projection box, a flexible projection display screen adjustment apparatus, and a flexible projection display screen. A main control module, a first wireless communication module, and a projection control module are disposed in the interactive projection box. The first wireless communication module and the projection control module are both connected to the main control module. The flexible projection display screen adjustment apparatus includes: a box body, a screw sliding table apparatus, a second wireless communication module, a laser ranging module, and an image capturing module. Accommodating cavities are disposed in the box body, screw sliding table apparatuses are disposed in all the accommodating cavities, and fastening supports are disposed on sliding tables of the screw sliding table apparatuses. The fastening supports are firmly connected to the flexible projection display screen, an image capturing module is disposed on the fastening supports on two side edges of the flexible display screen, and the laser ranging module is disposed on an inner side surface of one end of the accommodating cavity. The image capturing module, the laser ranging module, and a motor of the screw sliding table are all connected to the second wireless communication module.

The laser ranging module is configured to detect a distance between the sliding table of the screw sliding table apparatus and an inner side surface on which the laser ranging module is located.

The first wireless communication module and the second wireless communication module are configured to establish a wireless connection between the interactive projection box and the flexible projection display screen adjustment apparatus.

The image capturing module is configured to capture gesture image information from multiple angles.

The main control module is configured to perform fusion calculation on the captured gesture image information from multiple angles, to obtain pre-extracted gesture image information, extract gesture information from the pre-extracted gesture image information, search for and compare pre-stored gesture models according to the gesture information to obtain a matched gesture model, and control the screw sliding table apparatus according to a control command corresponding to the matched gesture model.

For the smart gesture interactive display apparatus with a holographic effect disclosed in the present invention, preferably, the image capturing module includes multiple high-definition cameras.

For the smart gesture interactive display apparatus with a holographic effect disclosed in the present invention, preferably, the projection control module includes: a laser projection assembly and a photoelectric sensor. Both the laser projection assembly and the photoelectric sensor are connected to the main control module.

The laser projection assembly is configured to project visible laser and invisible laser. The visible laser forms a projection area, the invisible laser forms an invisible laser area, and the invisible laser area covers the projection area.

The photoelectric sensor is configured to receive reflected light of the invisible laser, convert the reflected light into an electric signal, and transmit the electric signal to the main control module.

The main control module is further configured to determine coordinates of a position at which a user touches the flexible projection display screen according to the received reflected light signal, and determine a touch event.

For the smart gesture interactive display apparatus with a holographic effect disclosed in the present invention, preferably, the accommodating cavities include: a first accommodating cavity, a second accommodating cavity, a third accommodating cavity, and a fourth accommodating cavity. The fastening supports include: first fastening supports and second fastening supports. The first fastening supports are respectively disposed on sliding tables of the screw sliding table apparatuses in the first accommodating cavity and the fourth accommodating cavity. The second fastening supports are respectively disposed on sliding tables of the screw sliding table apparatuses in the second accommodating cavity and the third accommodating cavity.

For the smart gesture interactive display apparatus with a holographic effect disclosed in the present invention, preferably, the high-definition camera is disposed on the first fastening support.

For the smart gesture interactive display apparatus with a holographic effect disclosed in the present invention, preferably, the flexible projection display screen includes: a flexible transparent projection plate and a holographic film. The holographic film is pasted on one side that is of the flexible transparent projection plate and that is close to the laser projection assembly.

A method for controlling a smart gesture interactive display apparatus with a holographic effect, preferably, includes:
  capturing gesture image information from multiple angles, including: capturing the gesture image information from multiple angles by using multiple high-definition cameras;
  performing fusion calculation on the captured gesture image information from multiple angles, to obtain pre-extracted gesture image information;
  extracting gesture information from the pre-extracted gesture image information;
  searching and comparing pre-stored gesture models according to the gesture information, to obtain a matched gesture model; and
  controlling a screw sliding table apparatus according to a control command corresponding to the matched gesture model.

For the method for controlling a smart gesture interactive display apparatus with a holographic effect disclosed in the present invention, preferably, the gesture information includes: a left hand or right hand, a quantity of extended fingers, and an orientation of the back of the hand.

Beneficial effects of the present invention include at least the following: the screw sliding table apparatuses are disposed in all the accommodating cavities, and the fastening supports are disposed on sliding tables of the screw sliding table apparatuses. The fastening supports are firmly connected to the flexible projection display screen. The image capturing module is disposed on the fastening supports on two side edges of the flexible display screen, and the laser ranging module is disposed on an inner side surface of one end of the accommodating cavity. The image capturing module, the laser ranging module, and a motor of the screw sliding table are all connected to the second wireless communication module. The image capturing module captures the image information from multiple angles, and transmits the image information to the main control module through the second wireless communication module and the first wireless communication module. The main control module controls the screw sliding table apparatus, so that the bending angle of the flexible projection display screen can be adjusted by using a gesture.

In the drawings: 1. interactive projection box, 2. first fastening support, 3. flexible projection display screen, 4. second fastening support, 5. box body, 6. image capturing module, 7. sliding table, 8. screw, 9. first accommodating cavity, 10. second accommodating cavity, 11. third accommodating cavity, 12. fourth accommodating cavity, 13. laser ranging module, 14. main control module, 15. first wireless communication module, 16. second wireless communication module, 17. motor, 18. laser projection assembly, 19. photoelectric sensor.

DETAILED DESCRIPTION OF THE EMBODIMENTS

To better understand the foregoing objectives, features, and advantages of the present invention, the present invention is further described in detail below with reference to accompanying drawings and specific implementations.

Many specific details are set forth in the following description to fully understand the present invention. However, the present invention may alternatively be implemented in other ways different from those described herein. Therefore, the present invention is not limited to specific embodiments disclosed below.

As shown in FIG. 1, FIG. 2, FIG. 3, and FIG. 4, the present invention provides a smart gesture interactive display apparatus with a holographic effect, including: an interactive projection box 1, a flexible projection display screen adjustment apparatus, and a flexible projection display screen 3. A main control module 14, a first wireless communication module, and a projection control module are disposed in the interactive projection box. The first wireless communication module 15 and the projection control module are both connected to the main control module. The flexible projection display screen adjustment apparatus includes: a box body 5, a screw sliding table apparatus, a second wireless communication module 16, a laser ranging module 13, and an image capturing module 6. Accommodating cavities are disposed in the box body, screw sliding table apparatuses are disposed in all the accommodating cavities, and fastening supports are disposed on sliding tables of the screw sliding table apparatuses. The fastening supports are firmly connected to the flexible projection display screen, an image capturing module is disposed on the fastening supports on two side edges of the flexible display screen, and the laser ranging module is disposed on an inner side surface of one end of the accommodating cavity. The image capturing module, the laser ranging module, and a motor 17 of a screw sliding table are all connected to the second wireless communication module.

Figure 2:
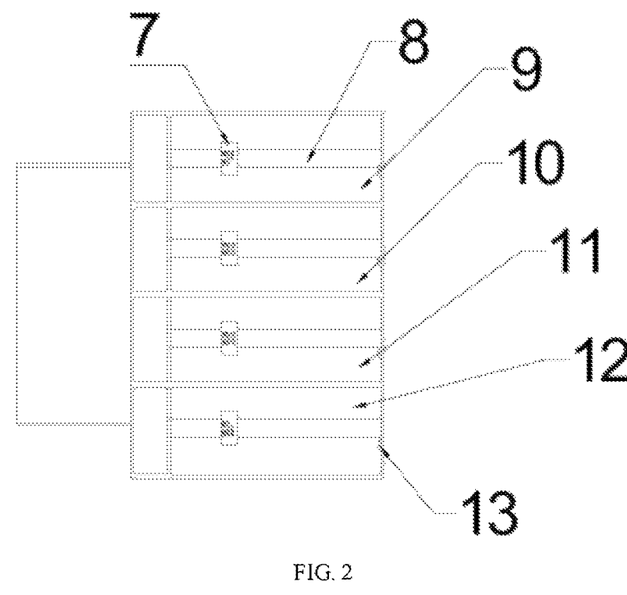
FIG. 2 is a schematic diagram of a flexible projection display screen adjustment apparatus according to an embodiment of the present invention.

The laser ranging module is configured to detect a distance between the sliding table 7 of the screw sliding table apparatus and an inner side surface on which the laser ranging module is located.

Figure 3:
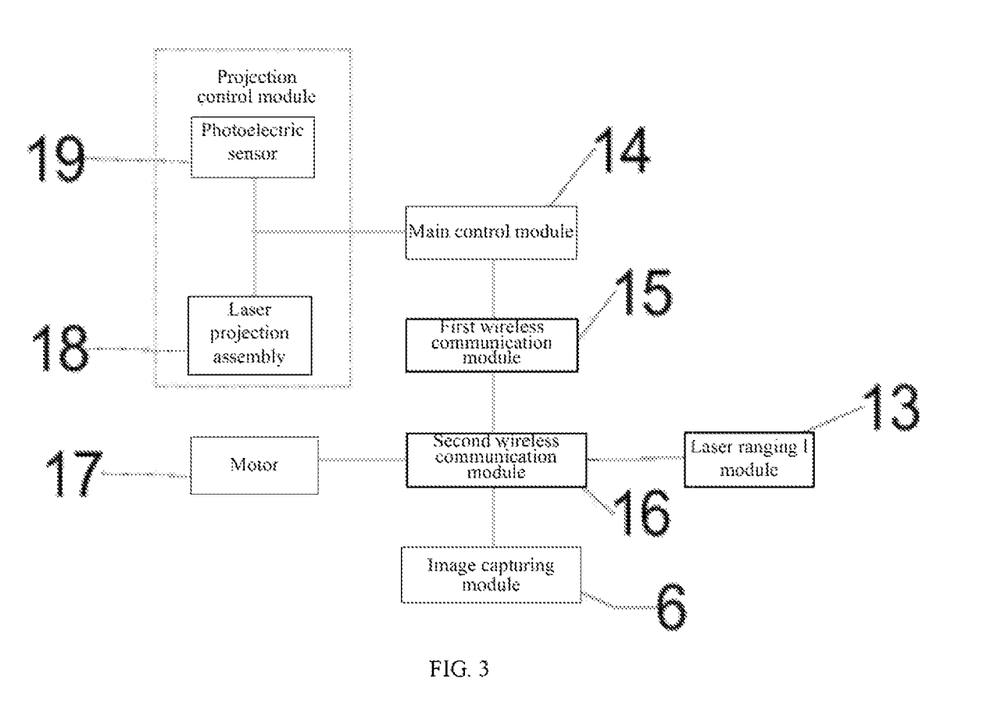
FIG. 3 is a schematic diagram of electrical components of a smart gesture interactive display apparatus with a holographic effect according to an embodiment of the present invention.

The first wireless communication module and the second wireless communication module are configured to establish a wireless connection between the interactive projection box and the flexible projection display screen adjustment apparatus.

The image capturing module is configured to capture gesture image information from multiple angles.

The main control module is configured to perform fusion calculation on the captured gesture image information from multiple angles, to obtain pre-extracted gesture image information, extract gesture information from the pre-extracted gesture image information, search for and compare pre-stored gesture models according to the gesture information to obtain a matched gesture model, and control the screw sliding table apparatus according to a control command corresponding to the matched gesture model.

In this embodiment, the main control module controls start or close of the motor of the screw sliding table apparatus, so that the sliding table walks on the screw 8.

For the smart gesture interactive display apparatus with a holographic effect, preferably, the image capturing module includes multiple high-definition cameras.

For the smart gesture interactive display apparatus with a holographic effect, preferably, the projection control module includes: a laser projection assembly 18 and a photoelectric sensor 19. Both the laser projection assembly and the photoelectric sensor are connected to the main control module.

The laser projection assembly is configured to project visible laser and invisible laser. The visible laser forms a projection area, the invisible laser forms an invisible laser area, and the invisible laser area covers the projection area.

The photoelectric sensor is configured to receive reflected light of the invisible laser, convert the reflected light into an electric signal, and transmit the electric signal to the main control module.

The main control module is further configured to determine coordinates of a position at which a user touches the flexible projection display screen according to the received reflected light signal, and determine a touch event.

For the smart gesture interactive display apparatus with a holographic effect, preferably, the accommodating cavities include: a first accommodating cavity 9, a second accommodating cavity 10, a third accommodating cavity 11, and a fourth accommodating cavity 12. The fastening supports include: first fastening support 2 and second fastening support 4. The first fastening supports are respectively disposed on sliding tables of the screw sliding table apparatuses in the first accommodating cavity and the fourth accommodating cavity. The second fastening supports are respectively disposed on sliding tables of the screw sliding table apparatuses in the second accommodating cavity and the third accommodating cavity.

For the smart gesture interactive display apparatus with a holographic effect, preferably, a high-definition camera is disposed on the first fastening support.

Figure 1:
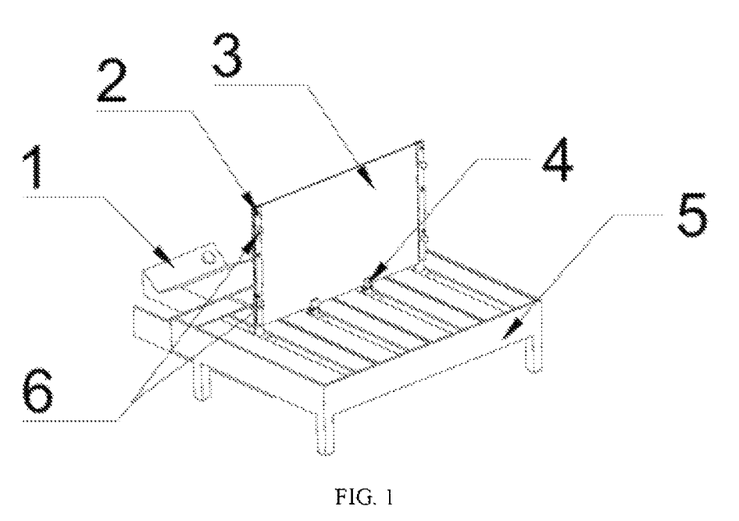
FIG. 1 is a schematic overall structural diagram of a smart gesture interactive display apparatus with a holographic effect according to an embodiment of the present invention.

For the smart gesture interactive display apparatus with a holographic effect, preferably, the flexible projection display screen includes: a flexible transparent projection plate and a holographic film. The holographic film is pasted on one side that is of the flexible transparent projection plate and that is close to the laser projection assembly.

Figure 4:
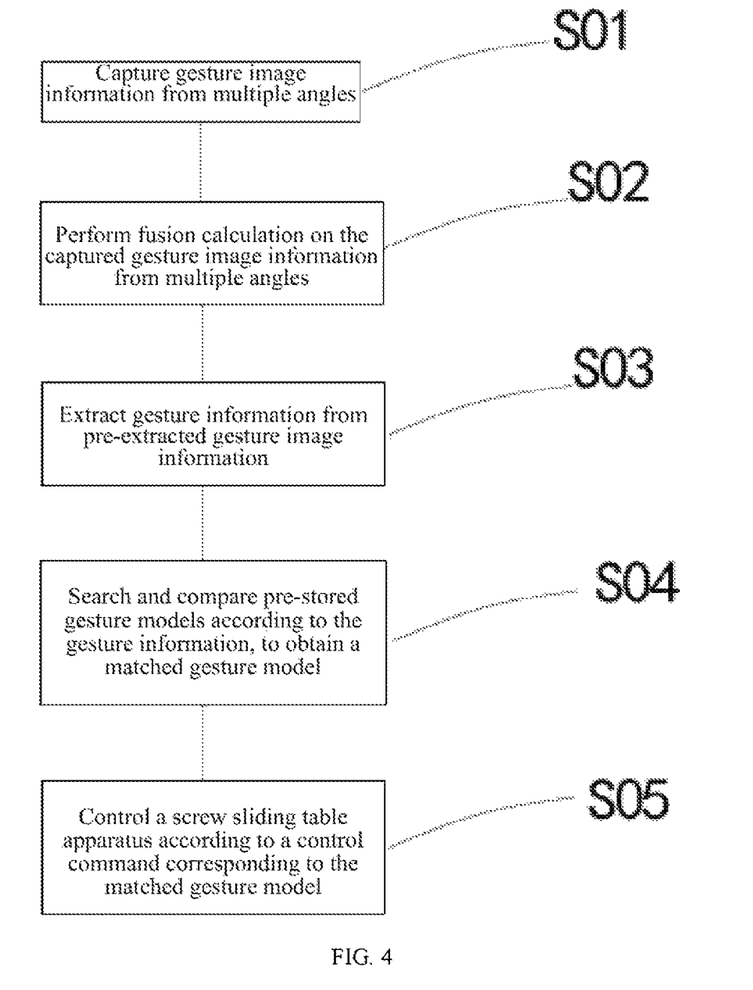
FIG. 4 is a schematic diagram of a method for controlling a smart gesture interactive display apparatus with a holographic effect according to an embodiment of the present invention.

A method for controlling a smart gesture interactive display apparatus with a holographic effect, preferably, includes:
  step S01: capturing gesture image information from multiple angles, including: capturing the gesture image information from multiple angles by using multiple high-definition cameras;
  step S02: performing fusion calculation on the captured gesture image information from multiple angles, to obtain pre-extracted gesture image information;
  step S03: extracting gesture information from the pre-extracted gesture image information;
  step S04: searching and comparing pre-stored gesture models according to the gesture information, to obtain a matched gesture model; and
  step S05: controlling a screw sliding table apparatus according to a control command corresponding to the matched gesture model.

For the method for controlling a smart gesture interactive display apparatus with a holographic effect, preferably, the gesture information includes: a left hand or right hand, a quantity of extended fingers, and an orientation of the back of the hand.

In this embodiment, an image capturing module captures the gesture image information from multiple angles, and transmits the gesture image information to a main control module through a wireless connection established between a second wireless communication module and a first wireless communication module. The main control module performs fusion calculation on the gesture image information captured from multiple angles, to obtain the pre-extracted gesture image information, extracts gesture image information in the pre-extracted gesture image information, searches and compares pre-stored gesture models in a database according to the gesture information, and obtains a control command corresponding to the matched gesture model to control movement of the screw sliding table.

Embodiment 1: In this embodiment, gesture information includes: a left hand or right hand, a quantity of extended fingers, and an orientation of the back of the hand. A high-definition camera of an image capturing module captures images within a specific period of time. When it is detected that a left hand is used, screw sliding table apparatuses in a first accommodating cavity and a fourth accommodating cavity are controlled. Then, it is detected whether the palm or the back of the hand is used. If the palm of the hand is used, the screw sliding table apparatuses are moved toward a direction of an operator. If the back of the hand is used, the screw sliding table apparatuses are moved in a direction away from the operator. Next, a quantity of fingers extended by the operator is detected. If the quantity of extended fingers is 1, a distance of one unit is moved. If the quantity of extended fingers is 2, a distance of two units is moved. If the quantity of extended fingers is 3, a distance of three units is moved, and so on.

Embodiment 2: In this embodiment, when it is detected that a right hand is used, screw sliding table apparatuses in a second accommodating cavity and a third accommodating cavity are controlled. Then, it is detected whether the palm or the back of the hand is used. If the palm of the hand is used, the screw sliding table apparatuses are moved toward a direction of an operator. Next, a quantity of fingers extended by the operator is detected. If the quantity of extended fingers is 1, a distance of one unit is moved. If the quantity of extended fingers is 2, a distance of two units is moved. If the quantity of extended fingers is 3, a distance of three units is moved, and so on.

Embodiment 4: A unit distance is a movement distance of a preset sliding table, which may be 3 mm, 5 mm, 8 mm, or 10 mm.

Embodiment 5: A laser ranging module detects a distance between each sliding table and a surface on which the laser ranging module is located, and a bending angle of a flexible projection display screen is obtained through calculation.

To sum up, the screw sliding table apparatuses are disposed in all the accommodating cavities, and fastening supports are disposed on sliding tables of the screw sliding table apparatuses. The fastening supports are firmly connected to the flexible projection display screen. The image capturing module is disposed on the fastening supports on two side edges of the flexible display screen, and the laser ranging module is disposed on an inner side surface of one end of the accommodating cavity. The image capturing module, the laser ranging module, and a motor of the screw sliding table are all connected to the second wireless communication module. The image capturing module captures the image information from multiple angles, and transmits the image information to the main control module through the second wireless communication module and the first wireless communication module. The main control module controls the screw sliding table apparatus, so that the bending angle of the flexible projection display screen can be adjusted by using a gesture.

In at least one embodiment, the laser ranging module comprising one or more hardware-based sensors that includes embedded firmware to measure distances with high precision. The first communication module comprises a wireless transceiver chipset (e.g., Bluetooth, Wi-Fi, or Zigbee), an optimized antenna system, one or more processors, and interface for connectivity. The laser ranging module and the first communication module may be implemented using one or more circuitry.

In at least one embodiment, the second wireless communication module comprises a wireless transceiver chipset (e.g., Bluetooth Low Energy, Wi-Fi, or Zigbee), an integrated antenna, a microcontroller for signal processing, and interfaces for peripheral connectivity. The module features power management circuits, onboard memory for firmware and buffer storage, and encryption protocols for secure data exchange. The second wireless communication module may implemented using one or more circuitry.

In at least one embodiment, the image capturing module comprises one or more high-definition cameras with wide-angle lenses, an image processing chipset for preprocessing captured data, and synchronization circuitry for multi-angle image fusion. The module integrates hardware accelerators for real-time processing, onboard storage for temporary data buffering, and connectivity interfaces. The image capturing module comprises software that includes firmware for camera control, algorithms for image enhancement and noise reduction, and gesture detection frameworks compatible with the main control module. This setup enables accurate capture and analysis of dynamic gestures, enhancing interactive functionality. The image capturing module may implemented using one or more circuitry.

In at least one embodiment, the main control module comprises one or more processors, onboard memory for program execution and data storage, and peripheral interfaces. The main control module may be implemented using one or more circuitry.

The foregoing descriptions are merely preferred embodiments of the present invention, and are not intended to limit the present invention. For a person skilled in the art, the present invention may have various modifications and variations. Any modifications, equivalent substitutions, improvements, and the like made within the spirit and principle of the present invention should be included within the protection scope of the present invention.

What is claimed is:

1. A smart gesture interactive display apparatus with a holographic effect, comprising:
   an interactive projection box,
   a flexible projection display screen adjustment apparatus,
   a flexible projection display screen,
   a main controller,
   a first wireless communication-circuitry module, and
   a projection control module are disposed in the interactive projection box, the first wireless communication module and the projection control module are both connected to the main control module,
   wherein the flexible projection display screen adjustment apparatus comprises:
   a box body,
   a screw sliding table apparatus,
   a second wireless communication module,
   a laser ranging module, and
   an image capturing module, accommodating cavities are disposed in the box body,
   wherein the screw sliding table apparatuses are disposed in all the accommodating cavities, fastening supports are disposed on sliding tables of the screw sliding table apparatuses, the fastening supports are firmly connected to the flexible projection display screen, and
   wherein the image capturing module is disposed on the fastening supports on two side edges of the flexible display screen, and the laser ranging module is disposed on an inner side surface of one end of the accommodating cavity, and the image capturing module, the laser ranging module, and a motor of the screw sliding table are all connected to the second wireless communication module;
   the laser ranging module is configured to detect a distance between the sliding table of the screw sliding table apparatus and an inner side surface on which the laser ranging module is located;
   the first wireless communication module and the second wireless communication module are configured to establish a wireless connection between the interactive projection box and the flexible projection display screen adjustment apparatus;
   the image capturing module is configured to capture gesture image information from multiple angles; and
   the main controller is configured to perform fusion calculation on the captured gesture image information from multiple angles, to obtain pre-extracted gesture image information, extract gesture information from the pre-extracted gesture image information, search for and compare pre-stored gesture models according to the gesture information to obtain a matched gesture model, and control the screw sliding table apparatus according to a control command corresponding to the matched gesture model.

2. The smart gesture interactive display apparatus with a holographic effect according to claim 1, wherein the image capturing module comprises multiple high-definition cameras.

3. The smart gesture interactive display apparatus with a holographic effect according to claim 1, wherein the projection control module comprises: a laser projection assembly and a photoelectric sensor, and both the laser projection assembly and the photoelectric sensor are connected to the main controller;
   the laser projection assembly is configured to project visible laser and invisible laser, the visible laser forms a projection area, the invisible laser forms an invisible laser area, and the invisible laser area covers the projection area;
   the photoelectric sensor is configured to receive reflected light of the invisible laser, convert the reflected light into an electric signal, transmit the electric signal to the main controller; and
   the main controller is further configured to determine coordinates of a position at which a user touches the flexible projection display screen according to the received reflected light signal, and determine a touch event.

4. The smart gesture interactive display apparatus with a holographic effect according to claim 1, wherein the accommodating cavities comprise: a first accommodating cavity, a second accommodating cavity, a third accommodating cavity, and a fourth accommodating cavity, the fastening supports comprise: first fastening supports and second fastening supports, the first fastening supports are respectively disposed on sliding tables of the screw sliding table apparatuses in the first accommodating cavity and the fourth accommodating cavity, and the second fastening supports are respectively disposed on sliding tables of the screw sliding table apparatuses in the second accommodating cavity and the third accommodating cavity.

5. The smart gesture interactive display apparatus with a holographic effect according to claim 2, wherein the high-definition camera is disposed on the first fastening support.

6. The smart gesture interactive display apparatus with a holographic effect according to claim 1, wherein the flexible projection display screen comprises: a flexible transparent projection plate and a holographic film, and the holographic film is pasted on one side that is of the flexible transparent projection plate and that is close to the laser projection assembly.

7. A method for controlling a smart gesture interactive display apparatus with a holographic effect, comprising:
capturing gesture image information from multiple angles, comprising: capturing the gesture image information from multiple angles by using multiple high-definition cameras;
performing fusion calculation on the captured gesture image information from multiple angles, to obtain pre-extracted gesture image information;
extracting gesture information from the pre-extracted gesture image information;
searching and comparing pre-stored gesture models according to the gesture information, to obtain a matched gesture model; and
controlling a screw sliding table apparatus according to a control command corresponding to the matched gesture model.

8. The method for controlling a smart gesture interactive display apparatus with a holographic effect according to claim 7, wherein the gesture information comprises: a left hand or right hand, a quantity of extended fingers, and an orientation of the back of the hand.

* * * * *